(12) United States Patent
Hesse et al.

(10) Patent No.: US 7,374,692 B2
(45) Date of Patent: May 20, 2008

(54) TREATMENT OF BALLAST WATER

(76) Inventors: Klaus Hesse, Süderwieke 26639 Wlesmoor, Wlesmoor (DE); Peilin Zhou, Dept. of Naval Architecture and Marine Engineering, Universities of Glasgow and Strathclyde, 100 Montrose Street, Henry Dyer Building, Glasgow G4 0LZ (GB); Tony Leigh, atg-willand, Enterprise House, Richmond Hill, Pemberton Wigan WN5 8AA (GB)

( * ) Notice: Subject to any disclaimer, the term of this patent is extended or adjusted under 35 U.S.C. 154(b) by 608 days.

(21) Appl. No.: 10/851,450

(22) Filed: May 21, 2004

(65) Prior Publication Data
US 2005/0258112 A1 Nov. 24, 2005

(51) Int. Cl.
*B01D 21/26* (2006.01)
*C02F 1/32* (2006.01)

(52) U.S. Cl. ............... 210/748; 210/764; 210/788; 210/806; 210/205; 210/512.1; 210/512.2; 422/24; 422/186.3

(58) Field of Classification Search ........... 210/748, 210/764, 788, 806, 205, 512.1, 512.2; 422/24, 422/186.3
See application file for complete search history.

(56) References Cited

U.S. PATENT DOCUMENTS

| | | | | | |
|---|---|---|---|---|---|
| 4,655,923 | A | * | 4/1987 | Leone | ............... 210/512.2 |
| 4,964,664 | A | * | 10/1990 | Crittenden | ............... 294/15 |
| 4,964,994 | A | * | 10/1990 | Wakley et al. | ........... 210/512.1 |
| 5,017,288 | A | * | 5/1991 | Thew et al. | ............. 210/512.1 |
| 6,464,884 | B1 | * | 10/2002 | Gadgil | ............... 210/748 |
| 2003/0010927 | A1 | | 1/2003 | Wedekamp | |
| 2003/0015481 | A1 | * | 1/2003 | Eidem | ............... 210/760 |
| 2004/0159599 | A1 | * | 8/2004 | Hamann et al. | ............ 210/202 |

FOREIGN PATENT DOCUMENTS

DE 36 24 169 A1 1/1987

* cited by examiner

*Primary Examiner*—David A Reifsnyder
(74) *Attorney, Agent, or Firm*—Akerman Senterfitt; Stephan A. Pendorf; Yonghong Chen

(57) ABSTRACT

The invention relates to hydrocyclones for ballast water treatment. The invention further relates to ballast water treatment systems comprising such hydrocyclones and methods of operating such hydrocyclones and ballast water treatment systems.

14 Claims, 5 Drawing Sheets

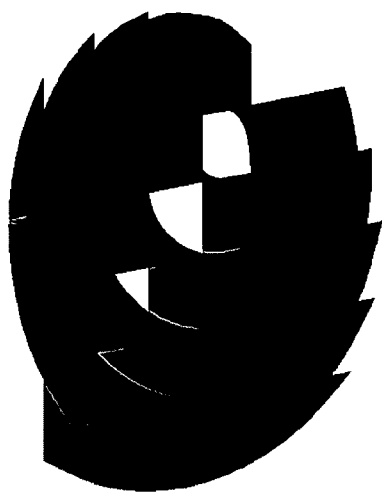
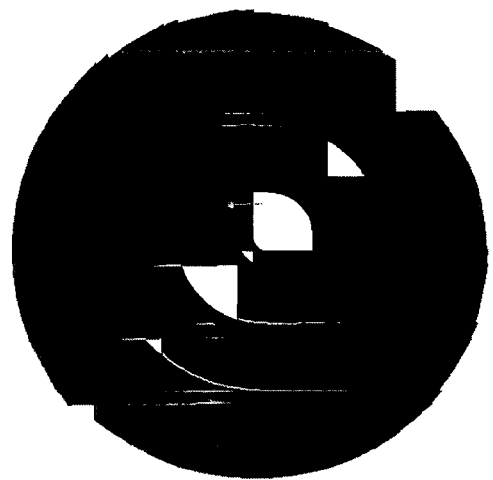
Fig. 3a                    Fig. 3b

TREATMENT OF BALLAST WATER

BACKGROUND OF THE INVENTION

1. Field of the Invention

The invention relates to hydrocyclones for ballast water treatment. The invention further relates to ballast water treatment systems comprising such hydrocyclones and methods of operating such hydrocyclones and ballast water treatment systems.

Ballast water intake is essential on cargo vessels in order to maintain a high degree of control and stability. During loading of ballast water, large volumes of sediment and marine species from the water columns and harbour floor are sucked into the ballast tanks. Upon deballasting at the vessel's destination, these species can be released into an alien environment. Frequently, the released species are no longer under control of their natural predators and can rapidly multiply in the new environment, thereby forming an invasive threat. Open-ocean exchange of ballast water is practiced with much difficulty, and current methods of ballast sludge removal induce large costs.

Furthermore, sediments sucked into the ballast tanks are difficult to remove therefrom and effectively accumulate in the ballast tanks. The accumulated sediments reduce the capacity of the cargo hold and cause problems with stability.

2. Description of the Related Art

Various methods have been exercised so far to reduce entry of marine species and sediments into ballast water tanks. For example, DE 203 02 516 U1 describes a ballast water treatment system comprising an array of hydrocyclones and optionally a reversible flow filter. The hydrocyclones are intended to remove particles with a density at least slightly higher than that of sea water, thereby producing a particle-reduced overflow stream. The system further comprises, for decontamination of the overflow stream, biocide injection means and/or UV irradiation means. The decontaminated overflow stream is then fed into a vessel's ballast tanks. The dimensions and operation parameters of the ballast water treatment system of DE 203 02 516 U1 are not disclosed therein.

It was an object of the present invention to optimise apparatus, systems and methods of operation for ballast water treatment systems, particularly of the type of system described in DE 203 02 516 U1.

SUMMARY OF THE INVENTION

Specifically, it was an objective of the present invention to provide an economically sound, efficient, space-saving, ecologically safe and reliable apparatus and system for ballast water treatment. These parameters mutually conflict with each other. For example, a gain in efficiency of particle removal most often coincides with an economically unreasonably low overflow stream to feed stream ratio, thereby requiring a large quantity of feed water to produce a comparatively low quantity of particle-reduced overflow water. This would result in either an economically prohibitively long time needed to fill a vessel's ballast tanks or an increased space required for larger apparatus. Likewise, relinquishing ecological safety for economical gain can result in the vessel becoming banned from harbours with stringent ecological practices.

It was a further objective of the present invention to optimise hydrocyclones for use in a ballast water treatment system. The hydrocyclones should allow removing a large fraction of particles with a density at least slightly higher than that of sea water. The hydrocyclones should also be easy to maintain, they should not require much space, they should have a low pressure drop, and they should operate reliably with feed water of varying composition. To find the best tradeoff between all requirements, it is necessary to optimise the dimensions of the various hydrocyclone components, particularly the dimensions of the main cylinder, of the conical section, the inflow, overflow and apex pipes, and the dimensions of the vortex finder. While these components are per se known to the skilled person, it is difficult to predict the effect changes of one component will inflict to the hydrocyclone e.g. regarding particle separation efficiency, pressure drop, residence time, reliability and overflow to feed ratio. The objective is made even more difficult by the fact that the composition of sea water for filling ballast tanks varies considerably among different regions and even between different seasons. For example, a high load of algae and weeds can lead to a poor separation efficiency for one type of hydrocyclone, but may not be a problem for other hydrocyclone types.

Another objective of the invention was to optimise the decontamination of overflow water. The term "decontamination" signifies that treated water contains 10 or less viable organisms per cubic metre greater than or equal to 50 µm in minimum dimension, and less than 10 viable organisms per milliliter less than 50 µm in minimum dimension and greater than or equal to 10 µm in minimum dimension.

The invention therefore provides a hydrocyclone for particle removal from ballast water, said hydrocyclone comprising a main cylinder with a main cylinder inside diameter Dc, an inlet pipe as a point of entry of a feed stream into the main cylinder, an overflow orifice as a point of exit of an overflow stream out of the main cylinder, a vortex finder situated within the main cylinder, a conical section emanating from one base of the main cylinder, and an apex orifice of the conical section, characterized in that

- the length of the main cylinder is from 1 to 0.97 times Dc, preferably 0.99 to 0.98 times Dc, most preferably 0.988 times Dc,
- the length of the conical section is from 4.5 to 3.5 times Dc, preferably 4.1 to 3.8 times Dc, most preferably 3.94 times Dc, and,
- at a feed stream flow rate of 125 m$^3$/h, an overflow stream with a flow rate of 100 m$^3$/h to 75 m$^3$/h is produced.

Unless otherwise indicated, all references in this specification to lengths and diameters refer to the lengths and diameters measured on a respective surface in contact with the ballast water to be treated. For example, the main cylinder diameter Dc is the inside diameter of the main cylinder, which comes into contact with water to be treated.

The hydrocyclone of the present invention is favourably adapted to and operates preferably with feed stream flow rates of 167 m$^3$/h to 20 m$^3$/h. These are common feed stream flow rates for filling ballast water tanks for various types and sizes of vessels. The hydrocyclone is particularly adapted to feed stream flow rates of 35 m$^3$/h to 27.5 m$^3$/h. Best results can be achieved with a feed stream flow rate of 32.5 m$^3$/h to 30 m$^3$/h, most preferably of 31.25 m$^3$/h. A combination of four such hydrocyclones, distributing a feed stream among them, is therefore particularly adapted for treatment of a feed stream with a flow rate of 140 m$^3$/h to 100 m$^3$/h; best results with such configuration can be achieved with a feed stream flow rate of 130 m$^3$/h to 120 m$^3$/h, most preferably of 125 m$^3$/h.

The hydrocyclone is also optimised for a maximum feed stream velocity of 3 m/s.

The hydrocyclone sends a relatively high percentage of particles of the scale 20 µm-150 µm with specific gravity of 1.1-2.5 g/cm$^3$ to an underflow stream emanating from the apex orifice. The hydrocyclone efficiently decreases particle load of the overflow stream. The hydrocyclone removes particles of at least 80 µm particularly well. Particles of this size would deteriorate the efficiency of a UV decontamination step. The hydrocyclone of the present invention thus reduces the need for powerful or prolonged UV irradiation in a downstream decontamination apparatus.

Another advantage of the hydrocyclone according to the invention is that it does not require a complex geometry or (except for the vortex finder) any interior devices. The hydrocyclone is therefore easy to maintain and comparatively inexpensive to build.

For further optimising the hydrocyclone of the present invention, the skilled person may adhere to the following guidelines:

The main cylinder, often referred to as the feed chamber, is cylindrical and effectively sets the diameter of the cyclone. For this reason the main cylinder diameter, Dc, is used to non-dimensionalise the other geometrical elements of the hydrocyclone. The Reynolds number in the separator is defined using Dc as the critical dimension. In general, the height of the main cylinder is at least 100% of the diameter. An increase in length generally will increase the retention time of the fluid in the hydrocyclone. However, a slightly shorter main cylinder length of 0.988 times Dc has proven particularly effective.

The vortex finder leading to the overflow orifice is used as a control mechanism for the separation and the flow leaving the hydrocyclone. The vortex finder is generally cylindrical in shape. It extends sufficiently below the inlet pipe junction with the main cylinder or, when the hydrocyclone comprises more than one inlet pipe, below the inlet pipes' junctions with the main cylinder, to prevent short-circuiting of material directly from the inlet pipe into the overflow. The key features of the vortex finder are its length and diameter which have a large influence on the volume of flow leaving the hydrocyclone through the overflow.

The conical section is vital in controlling the formation of the secondary vortex generating the overflow stream. The restriction of the apex to the downwardly spiralling primary vortex forming in the hydrocyclone under operation conditions determines the location of the secondary vortex formation. Length and angle of the conical section influences the retention time of the fluid in the hydrocyclone.

In many commercial hydrocyclonic separators additional features within the main cylinder and conical sections are used to further control elements of the flow. For example a solid core within the separator is thought to minimise clogging and abrasion within a narrow apex. This approach is not preferred in the present invention as it generally applies to applications involving heavier slurry type flows where larger, denser particles are expected in the feed fluid.

The diameter of the underflow or apex orifice determines the behaviour of the particles exiting from the separator. Ideally flow exiting the apex orifice should form a conical flow with a hollow centre. Should the apex orifice be too large in size a spray effect in the outflow can be expected which generally indicates maximised particle output is not being achieved. Similarly if the apex outflow is devoid of a hollow centre and is more spiral in form the apex orifice diameter is too small and particles which should be removed from the underflow may instead be reporting to the overflow.

It is particularly preferred for a hydrocyclone of the present invention to have a cylindrical vortex finder with an inner diameter from 0.6 to 0.75 times Dc and the vortex finder length from 0.55 to 0.65 times Dc. Under these conditions, good particle removal efficiency is obtained. Best results are obtained with a vortex finder inner diameter of 0.7 times Dc and a vortex finder length of 0.59 times Dc. Such vortex finders result in a favourable flow pattern within the hydrocyclone, further assisting in particle separation efficiency and a low pressure drop of the hydrocyclone unit. The thickness of the vortex finder is preferably even throughout the vortex finder. For all of the aforementioned vortex finder inner diameters, it is preferred that the vortex finder thickness is from 5 mm to 2 mm, most preferably 3 mm.

Furthermore, for a particularly preferred hydrocyclone of the present invention the cross-section area of each inlet pipe is from 0.03 to 0.05 times the squared Dc, most preferably 0.049 times the squared Dc. The inlet pipe can be joined to the main cylinder in an involuted feed type or in a tangential feed type. For ease of production and maintenance of the hydrocyclones according to the invention, a tangential feed type is preferred.

The hydrocyclone of the present invention can have any of 1, 2, 3, 4 or 5 inlet pipes of the type described above. The more inlet pipes, the larger is the feed flow rate that can be fed to the hydrocyclone. However, the pressure drop of the hydrocyclone unit turns unfavourably high for more than 5 inlet pipes. When there are more than 1 inlet pipe, it is preferred to have the inlet pipes arranged in a rotationally symmetric way around the main cylinder axis, to limit flow disturbances in the hydrocyclone main cylinder.

Particularly preferred is a hydrocyclone of the following dimensions: The main cylinder inside diameter (Dc) is from 245 mm to 265 mm, more preferably from 250 mm to 260 mm, and most preferably 254 mm. The vortex finder inner diameter is preferably from 180 mm to 170 mm, more preferably from 178 mm to 177 mm, and most preferably 177.8 mm. The vortex finder length is preferably 130 mm to 180 mm, more preferably 140 mm to 160 mm, and most preferably 150 mm. The vortex finder thickness is preferably from 5 mm to 2 mm, most preferably 3 mm. The inlet pipe is preferably of circular cross-section with an inside diameter from 65 mm to 50 mm, most preferably 63.5 mm. The length of the conical section is preferably 900 mm to 1100 mm, most preferably 1000 mm. The apex orifice diameter is preferably 92 mm to 80 mm, more preferably 90 mm to 86 mm, and most preferably 88,9 mm. Furthermore, the preferred hydrocyclone of the present invention comprises 4 or less of the aforementioned inlet pipes, said inlet pipes entering the main cylinder at substantially the same height and in a tangential feed type. It is particularly preferred for the hydrocyclone of the present invention to comprise only one inlet pipe. A pressure drop increase of 200% is experienced with a hydrocyclone comprising 4 input pipes compared to a hydrocyclone with only 1 input pipe.

The skilled person notes that the preferred measures indicated above can be freely combined with one another. Thus, a preferred hydrocyclone according to the invention can have a main cylinder diameter Dc from 250 mm to 260 mm, a vortex finder inner diameter from 178 mm to 177 mm, a vortex finder length from 140 mm to 160 mm, an inlet pipe of circular cross-section with a diameter from 65 mm to 50 mm, a conical section with a length of 1100 mm to 900 mm and an apex orifice diameter from 92 mm to 80 mm.

The invention also provides a ballast water treatment system for particle removal from ballast water, comprising at least one hydrocyclone of any of the aforementioned types according to the invention, a feed pipe connected to each inlet pipe of the at least one hydrocyclone, and an overflow pipe connected to each overflow orifice of the at least one hydrocyclone. Such ballast water treatment system favourably exploits the advantages of the hydrocyclones of the present invention for treating ballast water.

A particularly preferred ballast water treatment system according to the invention comprises from 2 to 10 of the aforementioned hydrocyclones, and more preferably comprises 3 to 6 of such hydrocyclones. Most preferred is a ballast water treatment system comprising 4 hydrocyclones of the type according to the invention.

According to the invention, the inlet pipes of the ballast water treatment system's hydrocyclones are connected to the feed pipe to ensure an equal feed to each hydrocyclone. This configuration applies both for a hydrocyclone with more than one inlet pipe and/or for more than one hydrocyclone with one or more inlet pipes. The preferred configuration prevents unequal particle loads for the inlet pipes, which otherwise could result in insufficient particle separation. A preferred configuration is that of a feed pipe leading into a central feed chamber with the hydrocyclones arranged radially along the circumference of the feed chamber.

For optimal decontamination, a ballast water treatment system of the invention preferably further comprises a UV treatment chamber in fluid connection with the overflow pipe, said UV treatment chamber comprising a UV lamp for decontaminating a water stream in the UV treatment chamber. UV decontamination is preferred over chemical decontamination because of its ecological safety, its efficiency, reliability and ease of operation. The UV treatment chamber during operation is preferably under pressure from the overflow stream of one or more hydrocyclones of the present invention. This ensures high flow speeds within the UV treatment chamber and that the UV treatment chamber is filled up completely.

The UV lamp of the ballast water treatment system preferably is arranged in cross-flow direction. Such UV lamp configurations are known for example from US patent application U.S. 2003/0010927 A1 and corresponding German patent application DE 101 29 178 A1. The UV lamp is essentially of cylindrical shape, with the lamp central axis arranged perpendicular to the main direction of flow within the UV treatment chamber. The UV lamp is most preferably located within a UV treatment chamber with a minimum inside width of 240 mm to 260 mm, preferably 250 mm, at the location of the UV lamp.

The UV lamp can be held on one side in a flange plate, whereby the opposite end can be supported in a simply formed recess. Also, it is possible that the UV lamp is held by flange plates facing each other which gives accessibility from both sides and good definition of the fitted position. It is preferred that the UV lamp is held by flange plates which are countersunk providing a seal into recesses of the wall of the UV treatment chamber. This preferred form of embodiment enables the conduit and the UV treatment chamber down to minute recesses to be prefabricated. The structures necessary for the final installation of the UV lamp are limited to relatively small subassemblies which reduces both the cost of the ballast water treatment system itself as well as the transport and assembly expense necessary.

The UV radiation emitting section of the UV lamp is preferably located within a cover tube of a pressure resistant, UV transmitting material like quartz glass. Simple maintenance of the UV lamp is made possible if the cover tube is arranged to provide a seal at least in the flange plate on the connection side and the UV lamp is to be fitted and removed without dismantling the cover tube. With such a form of embodiment, the UV lamp can be replaced during operation without fluid being able to escape at the connection points between the flange plate and the cover tube.

The outer diameter of the UV lamp is preferably between 30 and 40 mm, most preferably 36 mm. Where the UV lamp is located within a cover tube, the outer diameter of the cover tube is preferably between 30 and 40 mm, most preferably 36 mm, and the outer diameter of the UV lamp is correspondingly smaller. It has been found that a good irradiation of an overflow stream is achieved in a UV treatment chamber of the dimensions described above with the outer diameter of the UV lamp or cover tube as described just above.

Contrary to the disclosure of U.S. 2003/0010927 A1 and DE 101 29 178 A1, the wall of the UV treatment chamber may be made of a metallic material, preferably of steel, bronze, or any other pressure and UV irradiation resistant material.

The UV treatment chamber may also have a curved shape, for example such as known from German patent application DE 36 24 169 A1, FIG. 1a and its corresponding description.

It is most highly preferred if the UV treatment chamber comprises more than one UV lamp, preferably 3 to 6, most preferably 4 UV lamps, depending on the intensity of ultraviolet radiation emitted by the UV lamps. Furthermore, it is preferred to have all UV lamps of the UV treatment chamber located in one plane in line with the main flow direction produced in a fully filled UV treatment chamber. For such in-line configurations, a stable flow regime within the UV treatment chamber can be achieved with considerably low re-circulation and stagnation. Furthermore, this configuration causes less retention time than with a staggering lamp configuration, and also improves the time to first trace efficiency of the chamber. The term "time to first trace" is defined herein as the ratio of the minimum time of any particle in the chamber to the average time of particle retention within the chamber. In terms of static pressure drop across the chamber, in-line design provides a 30% reduction as compared to branched configurations of the UV treatment chamber inlet and outlet pipes.

When more than one UV lamp is employed, it is also preferred to provide means for rotating water flow within the UV treatment chamber by 90°. Such flow reorientation is preferably effected such that an equal number of UV lamps are located upstream and downstream of the area of flow reorientation. The means for reorientation are configured to provide a reorientation without unwanted secondary flow effects or rotation downstream of the means for reorientation. The means for reorientation are also preferably shaped to minimise the pressure drop incurred and prevent formation of any additional stagnation of the flow within the means for reorientation. The means for reorientation preferably consist of a set of staggered vanes with elongated downstream tails to limit turbulence.

For further decontamination, the ballast water treatment system according to the invention may comprise a filter, preferably a reverse-flow filter, for further separating smaller particles and organisms from the ballast water. Preferably, the filter is located downstream of a hydrocyclone of the present invention, to prevent untimely fast clogging of the filter and unnecessary wear and tear thereof.

It is also preferred for the ballast water treatment system of the present invention to comprise means for injection of a biocide into the ballast water to further decrease the count of viable organisms. The site of biocide injection preferably is located downstream of the hydrocyclone and preferably also downstream of a filter (if present), to limit biocide consumption.

The ballast water is treated according to the invention by a method comprising the steps of:
a) directing a feed stream of particle-laden water into a hydrocyclone according to the invention through an inlet pipe thereof,
b) in the hydrocyclone subjecting the water to an acceleration, thereby dividing the water into a particle-enriched underflow stream and a particle-reduced overflow stream, and
c) recovering the overflow stream through the overflow pipe of the hydrocyclone.

This method optimally exploits the advantages of the hydrocyclone and ballast water treatment system according to the invention as described above. Preferably the hydrocyclone is part of a ballast water treatment system according to the invention, and the feed stream is directed to each hydrocyclone of the ballast water treatment system through the feed pipe thereof.

For optimally treating ballast water, the method according to the invention further comprises the step of
d) irradiating the recovered overflow stream with ultraviolet irradiation to decontaminate the overflow stream.

The UV irradiation and decontamination preferably are performed in a UV treatment chamber as described above.

Particularly preferred hydrocyclones and ballast water treatment systems according to the invention are described in the examples section hereinafter with references to the accompanying figures. It will be understood that this description is not intended to define or limit the invention other than in the appended claims.

BRIEF DESCRIPTION OF THE DRAWINGS

FIG. 3 shows the control vanes of the UV treatment chamber of a preferred ballast water treatment system according to the invention.

DETAILED DESCRIPTION OF THE INVENTION

Figure 1A:
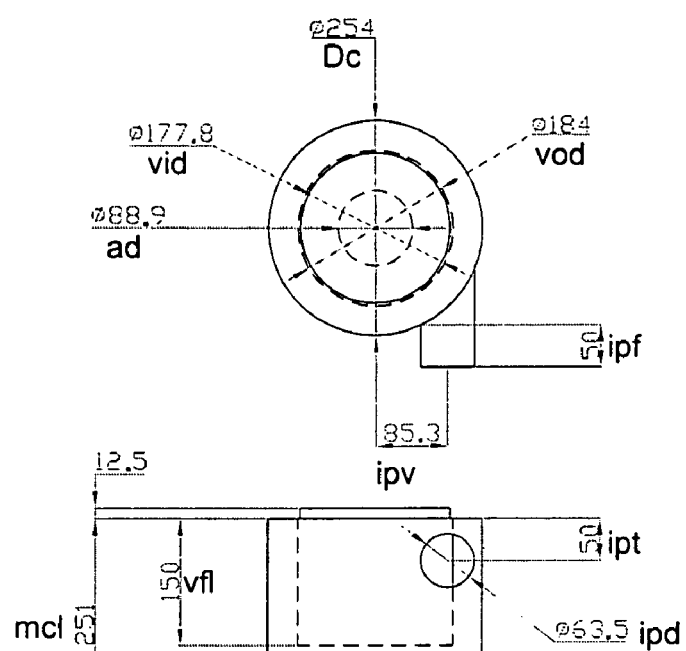
FIG. 1 shows a construction drawing of a preferred hydrocyclone according to the invention, in side view (FIG. 1a) and top view (FIG. 1b)
Figure 1B:
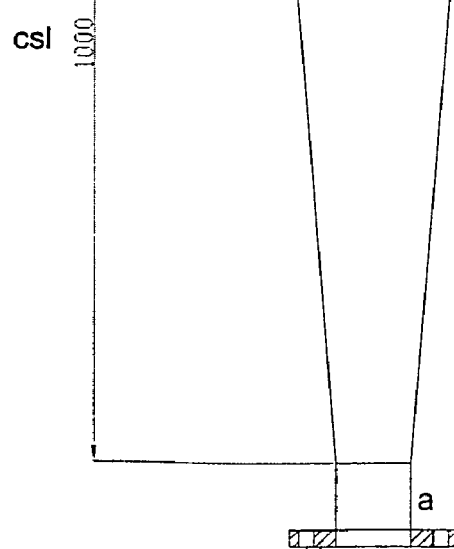

FIG. 1 shows a construction drawing of a preferred hydrocyclone according to the invention. All numbers indicate dimensions measured in millimetres and refer to those surfaces which can be contacted by ballast water in the course of treatment. Reference signs are given next to the respective dimension figures.

The hydrocyclone comprises a main cylinder. The main cylinder has a main cylinder inside diameter Dc of 254 mm and a main cylinder length mcl of 251 mm.

An inlet pipe of circular cross-section with a diameter ipd of 63.5 mm enters the main cylinder at a top distance ipt of 50 mm, measured from the center of the inlet pipe's circular cross-section to the inside top end of the main cylinder. The center of the inlet pipe's circular cross-section is set off from the main cylinder axis by a distance ipv of 85.3 mm. The inlet pipe extends for a length ipf of 50 mm from the inside surface of the main cylinder outwards.

The hydrocyclone may comprise more than one such inlet pipe. Preferably, they are arranged in a rotationally symmetrical manner around the main cylinder axis. A particularly preferred hydrocyclone comprises 4 such inlet pipes with respective dimensions ipd, ipt, ipv and ipf as given above.

From the lower end of the main cylinder, a conical section with a length csl of 1000 mm emanates. The conical section tapers out into an apex a with an apex diameter ad of 88.9 mm.

The main cylinder further comprises a vortex finder, extending from the top end of the main cylinder in the direction of the conical section. The vortex finder has an outer diameter vod of 184 mm, a vortex finder inner diameter vid of 177.8 mm and a length vfl of 150 mm. The vortex finder has a cylindrical shape; the vortex finder cylinder axis is identical with the main cylinder axis.

Figure 2:
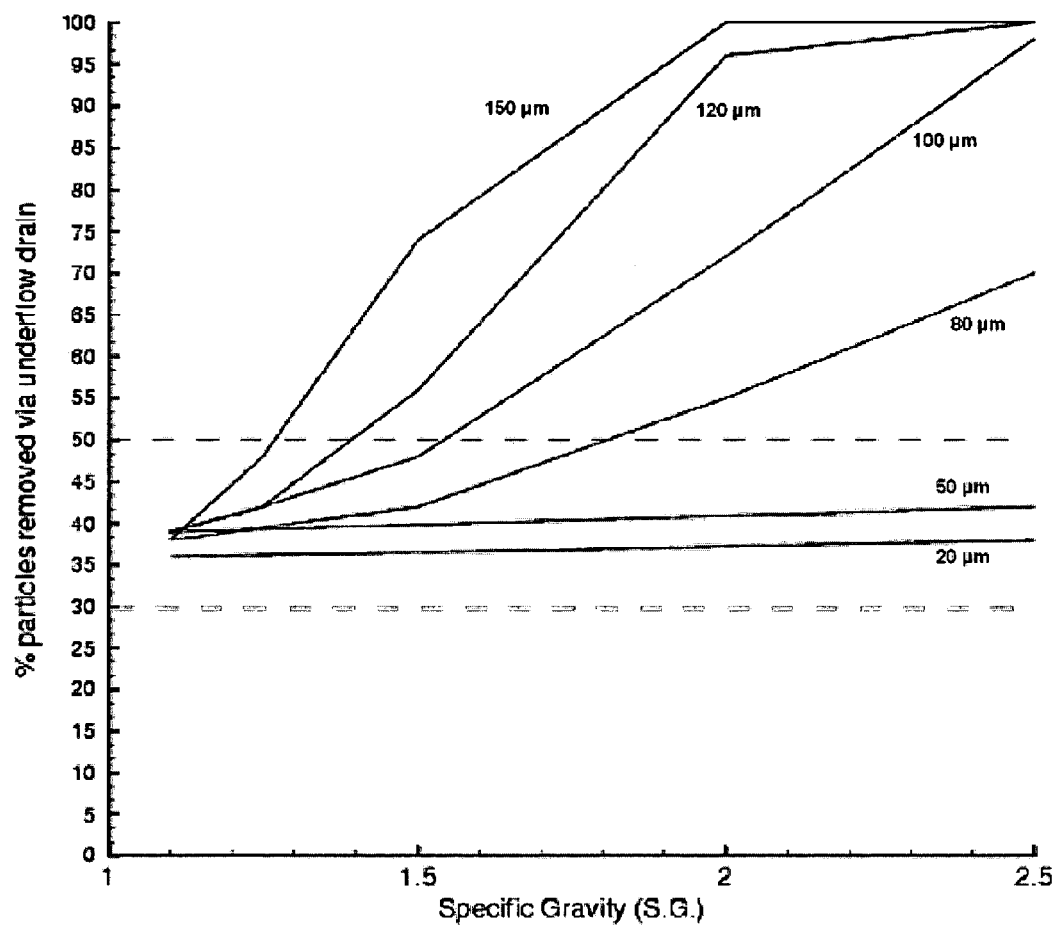
FIG. 2 shows the particle removal efficiency for the hydrocyclone of FIG. 1.

FIG. 2 shows the particle separation efficiency of the hydrocyclone of FIG. 1. It can be seen that a particle removal rate of 35% is obtained for particles with a diameter of 20 μm to 50 μm, regardless their density. However, at a particle diameter of 80 μm, 50% of the particles are removed from a feed stream fed to the hydrocyclone of FIG. 1 with a flow rate of 31.25 m$^3$/h and a density of 1.8 g/l. At the same operation parameters of the hydrocyclone of FIG. 1, 50% particle removal from the feed stream is achieved for a particle diameter of 100 μm and a density of 1.55 g/l. With higher particle diameters of 120 μm and 150 μm, 50% particle removal from the feed stream is achieved at a minimum density of 1.4 and 1.2 g/l, respectively.

Sand particles tend to have a specific gravity of 1.7 g/l. The skilled person will thus appreciate that according to FIG. 2, a good removal of large sand particles with diameters of 80 μm and larger is achieved by using the hydrocyclone of FIG. 1. As sand particles would hinder irradiation of microorganisms in a UV treatment step, the hydrocyclone of FIG. 1 significantly boosts the decontamination efficiency of a ballast water treatment system according to the invention.

FIG. 3 schematically shows flow reorientation vanes to be used in a cylindrical UV treatment chamber. The reorientation vanes are shaped to rotate a water stream in the UV treatment chamber by 90° while minimising the pressure drop incurred and prevent the formation of any additional stagnation of the flow within the UV treatment chamber and within the reorientation vanes.

FIG. 3a shows a set of such reorientation vanes in a perspective view. The set consists of five individual vanes. Each vane comprises two sickle blade or scythe blade-shaped halves. The halves each comprise a pointed end and taper off into a plane section at an angle of approximately 90° from the respective halve's pointed end. The pointed ends of the halves of an individual vane are displaced at an angle of approximately 90° against each other.

The vanes are arranged in a staggered configuration in order to substantially cover a complete circular cross-section of a UV treatment chamber. Thus, the vanes are arranged to rotate a water stream in a UV treatment chamber of circular cross-section by 90°.

FIG. 3b shows another set of reorientation vanes in front view. The set of FIG. 3b consists of five pairs of vanes that are closely spaced apart from each other, while maintaining a greater distance to the vanes of other pairs. The vanes are shaped and function like the vanes of FIG. 3a.

Figure 4A:
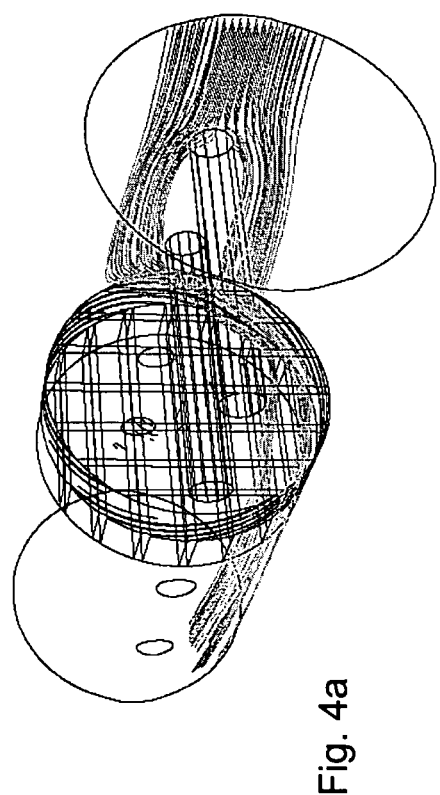
FIG. 4 shows particle tracks through the reorientation vanes of FIG. 3.

FIG. 4 shows particle traces through the reorientation vanes of FIG. 3b. FIG. 4a schematically shows the respective particle traces in a perspective view of a wire frame model. The reorientation vanes are located inside a cylindrical UV treatment chamber. The UV treatment chamber is indicated by circles at the respective ends of the UV treatment chamber. For clarity reasons, the cylindrical shell walls of the UV treatment chamber are not indicated; they extend between the circles that denote the respective ends of the UV treatment chamber.

The UV treatment chamber comprises four UV lamp cover tubes, individually indicated by a wire frame graphic. The UV lamp cover tubes are arranged in a cross-flow orientation and lie in one plane in line with the main flow direction within the UV treatment chamber. Inside each of the cover tubes, a UV lamp for decontamination of the overflow stream passing through the UV treatment chamber is located. Flow direction in FIG. 4a is from the front, right end of the UV treatment chamber to the back, left end of the UV treatment chamber.

The reorientation vanes are located between the second and third UV lamp cover tube (counted in main flow direction). The vanes' outermost edges touch the inside wall of the UV treatment chamber.

Figure 4B:
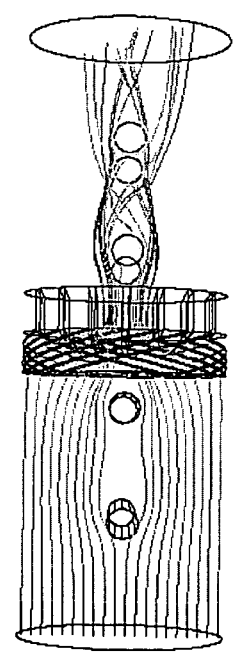

In operation, the reorientation vanes rotate the flow pattern in the UV treatment chamber by approximately 90°. This can be best seen in FIGS. 4b and 4c, respectively. Both figures show a side view of the UV treatment chamber of FIG. 4a along the plane of UV lamp cover tubes. Particle flow is from left to right in both figures. FIG. 4b shows traces of particles flowing into the UV treatment chamber on a plane ("entry plane") perpendicular to that of the UV lamp cover tubes. The particle traces are divided by the left, most upstream UV lamp cover tube, while an essentially laminar flow pattern with substantially parallel particle traces is maintained. After passing through the reorientation vanes, the particles follow flow paths extending essentially perpendicular to the entry plane. Downstream of the reorientation vanes turbulence is higher than upstream of the vanes, indicated by the non-parallel particle traces. However, it can be seen that downstream of the reorientation vanes all particle traces still essentially lie in one plane up to the fourth, most downstream UV lamp cover tube.

Figure 4C:
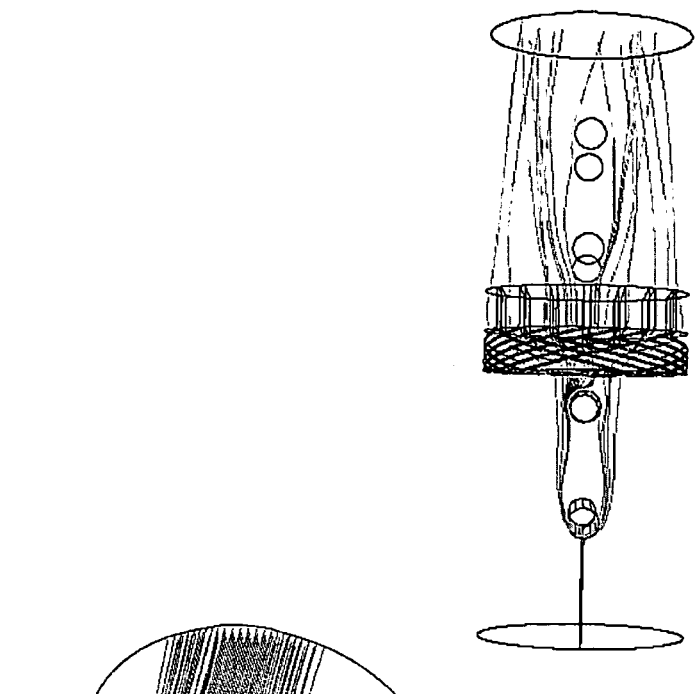

FIG. 4c differs from FIG. 4b in that the entry plane coincides with the plane of the UV lamp cover tubes and is thus rotated by 90° from the orientation of FIG. 4b. Again, it can be seen that the UV lamp cover tube arrangement upstream of the reorientation vanes cause little turbulence, as the particle traces run essentially parallel to each other. Downstream of the reorientation vanes, the particles follow flow paths running essentially perpendicular to the entry plane and essentially parallel to each other, indicating a low turbulence up to the fourth, most downstream UV lamp cover tube.

Figure 5:
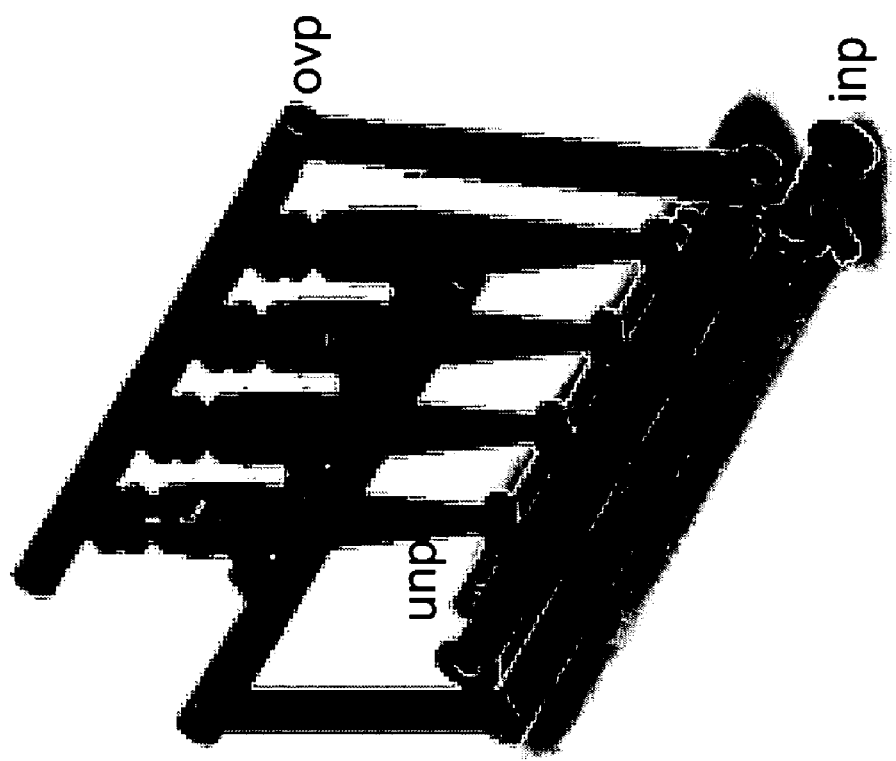
FIG. 5 shows a ballast water treatment system according to the invention comprising 4 hydrocyclones of FIG. 1.

FIG. 5 schematically shows a perspective view of a ballast water treatment system. The ballast water treatment system comprises four hydrocyclones of FIG. 1. Each hydrocyclone has one inlet pipe. The inlet pipes are in fluid connection with an inlet feeder pipe inp. The inlet feeder pipe feeds a feed stream of 125 m³/h to the hydrocyclones. The hydrocyclones operate in parallel, dividing the feed stream into a particle enriched underflow stream and a particle depleted overflow stream. The underflow streams of the hydrocyclones are reunited by an underflow pipe unp which is in fluid connection with the apex orifice of each hydrocyclone. The overflow streams of the hydrocyclones are merged by an overflow pipe ovp which is in fluid connection with the overflow orifice of each hydrocyclone via a flange connection. The overflow pipe ovp is connected to a UV treatment chamber (not shown) as described in FIGS. 4a, 4b and 4c for further decontamination of the overflow stream. The ballast water treatment system is mounted on board of a vessel (not shown).

In operation, a feed stream of untreated water is directed to the hydrocyclones by the inlet feeder pipe inp. The hydrocyclones divide the feed stream into a particle enriched underflow stream and a particle depleted overflow stream. The underflow stream is discharged from the ballast water treatment system by the underflow pipe unp and is discharged from the vessel. The overflow stream is fed into the UV treatment chamber by the overflow pipe ovp and is further decontaminated in the UV treatment chamber by UV treatment. The thus treated water is then fed to a ballast tank of the vessel.

What is claimed is:

1. A hydrocyclone for particle removal from ballast water, the hydrocyclone comprising
  a main cylinder with a main cylinder inside diameter Dc and a length, the main cylinder having a base,
  at least one inlet pipe as a point of entry of a feed stream into the main cylinder,
  an overflow orifice as a point of exit of an overflow stream out of the main cylinder,
  a vortex finder situated within the main cylinder, the vortex finder having an inner diameter and a length,
  a conical section extending from the base of the main cylinder and having a length, and
  an apex orifice formed at an end of the conical section, wherein
  the length of the main cylinder is from 1 to 0.97 times Dc,
  the length of the conical section is from 4.5 to 3.5 times Dc, and,
  at a feed stream flow rate of 125 m³/h, an overflow stream with a flow rate of 100 m³/h to 75 m³/h is produced.

2. The hydrocyclone of claim 1, wherein the vortex finder inner diameter is from 0.6 to 0.75 times Dc and the vortex finder length is from 0.55 to 0.65 times Dc.

3. The hydrocyclone of claim 1, wherein the area of each inlet pipe is from 0.03 to 0.05 times the squared Dc.

4. The hydrocyclone of claim 1, wherein the number of inlet pipes is 2, 3, 4 or 5.

5. A ballast water treatment system for particle removal from ballast water, comprising:
  at least one hydrocyclone, each hydrocyclone including:
    a main cylinder with a main cylinder inside diameter Dc and a length, the main cylinder having a base,
    at least one inlet piye as a point of entry of a feed stream into the main cylinder,
    an overflow orifice as a point of exit of an overflow stream out of the main cylinder,
    a vortex finder situated within the main cylinder, the vortex finder having an inner diameter and a length,
    a conical section extending from the base of the main cylinder and having a length, and
    an apex orifice formed at an end of the conical section, wherein
    the length of the main cylinder is from 1 to 0.97 times Dc,
    the length of the conical section is from 4.5 to 3.5 times Dc, and,
    at a feed stream flow rate of 125 m³/h, an overflow stream with a flow rate of 100 m³/h to 75 m³/h is produced, a feed pipe connected to each overflow orifice of the at least one hydocyclone, and an overflow pipe connected to each overflow orifice of the at least one hydrocyclone.

6. The ballast water treatment system according to claim 5, wherein the number of hydrocyclones is selected from 2 to 10.

7. The ballast water treatment system according to claim 6, wherein the feed pipe is connected to the inlet pipes of the hydrocyclones to ensure an equal feed to each hydrocyclone.

8. The ballast water treatment system according to claim 5, further comprising a UV treatment chamber in fluid connection with the overflow pipe, said UV treatment chamber comprising a UV lamp for decontaminating a water stream in the UV treatment chamber.

9. The ballast water treatment system according to claim 8, wherein the UV lamp is arranged in cross-flow direction.

10. A naval vessel comprising a hydrocyclone for particle removal from ballast water, the hydrocyclone comprising:
   a main cylinder with a main cylinder inside diameter Dc and a length, the main cylinder having a base,
   at least one inlet pipe as a point of entry of a feed stream into the main cylinder,
   an overflow orifice as a point of exit of an overflow stream out of the main cylinder,
   a vortex finder situated within the main cylinder, the vortex finder having an inner diameter and a length,
   a conical section extending from the base of the main cylinder and having a length, and
   an apex orifice formed at an end of the conical section, wherein
   the length of the main cylinder is from 1 to 0.97 times Dc,
   the length of the conical section is from 4.5 to 3.5 times Dc, and,
   at a feed stream flow rate of 125 m$^3$/h, an overflow stream with a flow rate of 100 m$^3$/h to 75 m$^3$/h is produced.

11. A method of particle removal from ballast water, comprising the steps of:
   a) providing a hydrocyclone including:
      a main cylinder with a main cylinder inside diameter Dc and a length, the main cylinder having a base,
      at least one inlet pipe as a point of entry of a feed stream into the main cylinder,
      an overflow orifice as a point of exit of an overflow stream out of the main cylinder,
      a vortex finder situated within the main cylinder, the vortex finder having an inner diameter and a length,
      a conical section extending from the base of the main cylinder and having a length, and
      an apex orifice formed at an end of the conical section, wherein
      the length of the main cylinder is from 1 to 0.97 times Dc,
      the length of the conical section is from 4.5 to 3.5 times Dc, and,
      at a feed stream flow rate of 125 m$^2$/h, an overflow stream with a flow rate of 100 m$^3$/h to 75 m$^3$/h is produced,
   b) directing a feed stream of particle-laden water into the hydrocyclone through the inlet pipe thereof,
   c) in the hydrocyclone subjecting the water to an acceleration, thereby dividing the water into a particle-enriched underflow stream and a particle-reduced overflow stream,
   d) recovering the overflow stream through the overflow orifice of the hydrocyclone.

12. The method according to claim 11, wherein the hydrocyclone is part of a ballast water treatment system including a plurality of hydrocyclones and having a feed pipe connected to the inlet pipes of the hydrocyclones, and wherein the feed stream is directed to each hydrocyclone of the ballast water treatment system through the feed pipe thereof.

13. The method according to claim 11, further comprising the step of
   e) irradiating the recovered overflow stream with ultraviolet irradiation to decontaminate the overflow stream.

14. A naval vessel comprising a ballast water treatment system for particle removal from ballast water, comprising:
   at least one hydrocyclone, each hydrocyclone including:
      a main cylinder with a main cylinder inside diameter Dc and a length, the main cylinder having a base,
      at least one inlet pipe as a point of entry of a feed stream into the main cylinder,
      an overflow orifice as a point of exit of an overflow stream out of the main cylinder,
      a vortex finder situated within the main cylinder, the vortex finder having an inner diameter and a length,
      a conical section extending from the base of the main cylinder and having a length, and
      an apex orifice formed at an end of the conical section, wherein
      the length of the main cylinder is from 1 to 0.97 times Dc,
      the length of the conical section is from 4.5 to 35 times Dc, and,
      at a feed stream flow rate of 125 m$^3$/h, an overflow stream with a flow rate of 100 m$^3$/b to 75 $^3$/b is produced,
   a feed pipe connected to each inlet pipe of the at least one hydrocyclone, and
   an overflow pipe connected to each overflow orifice of the at least one hydrocyclone.

* * * * *